United States Patent [19]
Warren et al.

[11] 3,930,127
[45] Dec. 30, 1975

[54] TONE DETECTOR

[75] Inventors: George H. Warren; Gunnar Hurtig, III, both of San Jose, Calif.

[73] Assignee: Baldwin Electronics, Inc., Little Rock, Ark.

[22] Filed: Jan. 18, 1974

[21] Appl. No.: 434,445

[52] U.S. Cl. .............................. 179/84 VF; 330/107
[51] Int. Cl.$^2$ .............................. H04M 1/50
[58] Field of Search ........ 179/84 VF; 330/107, 109, 330/20, 21; 321/47; 328/149, 150, 167

[56] References Cited

UNITED STATES PATENTS

| | | | |
|---|---|---|---|
| 3,128,349 | 4/1964 | Boesch et al. | 179/84 VF |
| 3,140,357 | 7/1964 | Bischof et al. | 179/84 VF |
| 3,288,940 | 11/1966 | Bennett | 179/84 VF |
| 3,701,857 | 10/1972 | Usuda et al. | 179/84 VF |
| 3,780,230 | 12/1973 | Bowen et al. | 179/84 VF |
| 3,795,775 | 3/1974 | Cowpland | 179/84 VF |

OTHER PUBLICATIONS

D. G. Hurel and P. Austruy, "Active Band-Pass Filter," IBM Technical Disclosure Bulletin, Vol. 11, No. 5, Oct. 1968, p. 491.

*Primary Examiner*—Kathleen H. Claffy
*Assistant Examiner*—Joseph Popek
*Attorney, Agent, or Firm*—Alan H. MacPherson

[57] ABSTRACT

A tone detector comprises a bandpass filter, a detector and a comparator circuit. The center frequency, gain and Q of the bandpass filter are each individually adjustable. By providing hysteresis between the levels of the output signal from, and the input signal to, the comparator, the effect of noise on the circuit is minimized and the bounce of the output signal is reduced.

13 Claims, 2 Drawing Figures

TONE DETECTOR

BACKGROUND OF THE INVENTION

1. Field of the Invention

This invention relates to a tone detector and in particular to a tone detector wherein the gain, center frequency and Q of the detector can be independently adjusted to achieve optimal flexibility in detecting tone signals.

2. Prior Art

Tone detectors are well known. A typical tone detector module used in the telephone network has a plurality of bandpass filters the center frequencies of which are selected to detect a plurality of tone signals at selectively spaced frequencies. Ideally, each tone detector in the module should be compact, inexpensive and capable of being easily modified to detect any one of a large number of different-frequency tone signals. A tone detector for use in the telephone system typically should be capable of being tuned to detect a signal between 300 hertz and 3 kilohertz, for example.

SUMMARY OF THE INVENTION

This invention provides a tone detector which overcomes many of the disadvantages of prior art tone detectors and which is capable of being used with a variety of logic families currently being produced by the semiconductor industry.

In accordance with this invention a tone detector circuit comprises means for filtering an input signal to produce a first output signal at a first selected frequency, means for detecting said first output signal to produce a second output signal, and means for comparing said second output signal to a reference signal to produce a bilevel output signal.

In the preferred embodiment, the means for detecting comprises means for rectifying said first output signal to produce a first rectified signal. Said means for comparing comprises means for integrating said first rectified signal to produce a first integrated signal and means for comparing said first integrated signal to a reference signal to produce said bilevel output signal.

As a feature of this invention the means for filtering is capable of having its gain, center frequency, and Q independently adjusted.

The means for detecting is arranged to compensate for a DC offset signal component from a DC offset circuit in the means for filtering. Thus the coupling capacitor previously required between the means for filtering and the means for detecting is eliminated.

As another feature of the invention the means for comparing is such that its output signal can be used with circuit components from a large number of logic families.

Addition of a feedback path from the means for comparing's output lead to its input lead increases the noise rejection capability of the circuit and minimizes output signal bounce.

The tone detector of this invention is particularly suitable for use in telephone systems requiring tone frequency detectors and in MF (multi-frequency) detection.

DETAILED DESCRIPTION

Figures 1, 2:
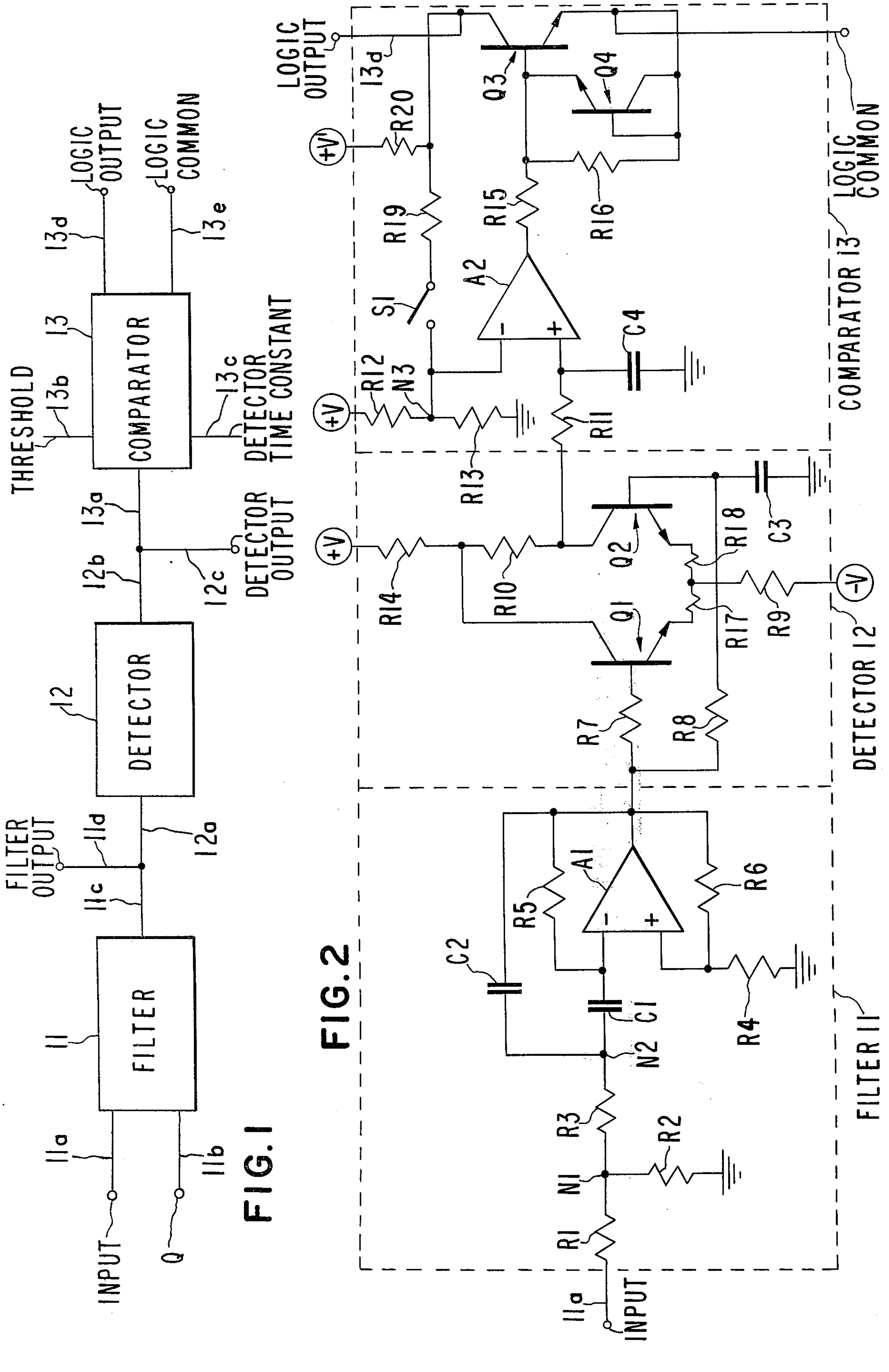
FIG. 1 shows this invention in schematic block diagram form.
FIG. 2 shows the circuit components comprising one embodiment of the structure shown in FIG. 1.

In the embodiment shown in FIG. 1 an input signal is applied to input lead 11*a* of filter 11. In one embodiment filter 11 is a second order bandpass filter and comprises a single amplifier, multi-feedback, active filter using an operational amplifier of a type commonly known in the circuit arts. Other appropriate filter circuits can also be used.

The output signal from filter 11 is transmitted to detector 12 and there rectified. In one embodiment detector 12 comprises a differential input (DC) single ended output (AC) detector.

From detector 12, the rectified output signal is sent to comparator 13 where it is compared to a threshold level and used to generate a high or low level output signal on output lead 13d. Comparator 13 typically has an open collector output lead.

Various output signals can be obtained from the circuit at intermediate points in the circuit as shown by filter output lead 11d, detector output 12*c* and threshold lead 13*b*. The time constant of detector 12 can also be adjusted by adding additional components to lead 13*c* of comparator 13.

FIG. 2 shows in more detail the circuitry comprising the preferred embodiment of the structure shown in FIG. 1. In the description of FIG. 2, the preferred values of the components in the preferred embodiment are placed in parenthesis following the first mention of the component. The values of all resistors are expressed in ohms and the values of all capacitors are expressed in microfarads ($\mu$f) or picofarads (pf) as specified. Components with values which differ from the specified values can, of course, be used provided the resulting changes in circuit performance are acceptable.

The input signal containing the tone signal to be detected is transmitted on lead 11*a* through resistors R1 (100K) and R3 (22K to 26K) and capacitor C1 (1100 to 2200 pf) to the negative input lead of amplifier A1. Amplifier A1 is of a design well known in the circuit arts and could be, for example, of a type such as the Signetics 5558. Resistor R2 (1.59K), connected from the node N1 between resistors R1 and R3 to ground, is set to control the approximate center frequency of the bandpass filter. Resistors R1, R2 and R3 comprise a resistive T network. With capacitor C2 (1100 to 2200 pf) connected between the output lead of operational amplifier A1 and node N2 and with capacitor C1 fixed in value, resistors R3 and R5 (332K to 389K) are adjusted for the correct center frequency corresponding to the frequency of the tone to be detected. This adjustment is done by adjusting R5, connected in parallel with series-connected capacitors C1 and C2, to a predetermined value and then adjusting R3 for a 180° phase shift from input to output of the filter.

The Q of filter 11 is next adjusted by varying the ratio of the values of resistor R4 (12.4K) connecting the positive input lead of amplifier A1 to ground, and resistor R6 (100K) which connects the output lead from amplifier A1 to its positive input lead. This is done by adjusting the value of R4 for a 180° plus 45° or 180° minus 45° phase shift at the output of the filter at the frequency corresponding to the minus 3 dB point on the amplitude vs. frequency characteristic of filter 11.

The gain of filter 11 is set by adjusting the ratio of values of resistors R1 and R2 to obtain the desired gain through the filter. Thus the center frequency, Q, and gain of the bandpass filter are independently adjustable.

The output signal from filter 11 is transmitted to the input lead of detector 12. As shown in FIG. 2, detector 12 comprises a pair of transistors, Q1 and Q2 differentially connected and biased such that with no AC signal at the input lead of detector circuit 12, the voltage on the collector of Q2 is approximately half way between +V and −V regardless of the DC level of the signal from filter 11. Resistors R7 (10K) and R8 (10K) are balanced. By coupling the bases of transistors Q1 and Q2 to the output lead of the filter 11, the DC offset signal from the active filter 11 is cancelled and does not affect the threshold of the detector 12.

Bypass capacitor C3 (0.1 μf) connected to the base of transistor Q2 is selected to attenuate any AC signal transmitted from filter 11 and makes the differential pair Q1 and Q2 single-ended to AC signals. Therefore, the AC signal drives the base of transistor Q1 but does not drive the base of transistor Q2 and there is gain from the base of Q1 to the collector of Q2. Since the collector of Q2 is biased at saturation, an AC signal on the base of Q1 is amplified and appears at Q2's collector as a half-wave rectified signal with an average value which is positive. The output signal on the collector of Q2 appears as a voltage drop across collector resistor R10 (5K).

Resistor R14 (3K) connects resistor R10 to the positive supply voltage +V. While the negative-to-positive voltage across a transistor normally cannot exceed 20 volts, resistor R14, connected directly and indirectly to the collectors of transistors Q1 and Q2 respectively, allows the use of a 24 volt power supply with the circuit of this invention (i.e. allows the difference between +V and −V to be 24 volts.)

Resistors R17 (500) and R18 (500) connect the emitters of transistors Q1 and Q2, respectively, to resistor R9 (5K) which is connected to the negative power supply −V. Resistors R17 and R18 stabilize the gains of transistors Q1 and Q2 so that the gains of these transistors remain substantially constant for variations in temperature over the operating temperature range of the circuit (typically 0°C to 55°C).

The output signal from detector 12 is transmitted to an integrator comprising resistor R11 (40K) and capacitor C4 (0.1 μf), in comparator 13. The integrated signal is transmitted to the positive input lead of amplifier A2. Typically, amplifier A2 comprises an operational amplifier such as the Signetics 5558.

The negative input to amplifier A2 is connected at the node N3 between resistors R12 (100K) and R13 (10.5K) connected as a voltage divider between positive voltage source +V and ground. So long as the input signal on the positive input lead to amplifier A2 is zero or less than the magnitude of the input signal on the negative (inverting) input lead to this amplifier, the output signal from amplifier A2 is saturated at a negative value. Transistor Q3, which is driven by the output signal from amplifier A2, is thus turned off. The output signal from the comparator 13 is taken from the collector of Q3.

Resistor R11 and capacitor C4 integrate the output signal from detector 12. When the signal on the positive input lead to amplifier A2 exceeds the threshold voltage on the negative input lead to this amplifier, amplifier A2 saturates positive, turning on Q3 and thus causing a low level logic signal to be generated on the logic output lead **13*d* from comparator 13. This low level signal is generated by the voltage drop across resistor R20 (1.5K) created by the collector current through transistor Q3. Resistor R20 represents the load circuit connected to output lead 13*d*** and is thus connected to the positive voltage source $+V^1$ associated with this load circuit.

In an alternative embodiment of this invention, hysteresis is added to comparator 13 by connecting resistor R19 (301K) between the collector of Q3 and node N3. This connection is made in the circuit of FIG. 2 by closing switch S1. In practice, however, resistor R19 is merely connected into the circuit directly between node N3 and the collector of Q3 and switch S1 is not required. The increased collector current through transistor Q3 which increases the voltage drop across resistor R20 also increases the voltage drop across resistor R12 thereby lowering the threshold voltage at which amplifier A2 produces a positive output signal. Thus the level of the signal on the positive input lead to amplifier A2 can drop beneath the level required to turn on transistor Q3 without turning off transistor Q3. This hysteresis effect increases the immunity of the circuit to noise. When R19 is 301K the hysteresis range is 1.0 dB. By changing the value of R19, the hysteresis range is changed.

Transistor Q4 is connected as a diode across the base-emitter junction of transistor Q3 to prevent reverse breakdown of the base-emitter junction of transistor Q3 when the output signal from amplifier A2 becomes saturated negatively. Resistor R16 (750) together with resistor R15 (2K) limits the base current to Q3 and limits the current through Q4.

Output transistor Q3 is floating with both collector and emitter unconnected to circuit ground or supply voltage. This allows the tone detector circuit to be connected for use with a single or dual (complementary) power supply and also allows a variety of logic supply voltages to be used. The emitter of Q3 thus can be connected to the common lead of the logic circuit to be driven by this tone detector circuit.

The addition of resistor R19 as a feedback between the collector of output transistor Q3 and negative input lead of amplifier A2 adds hysteresis to the circuit and thus increases noise rejection and minimizes bounce of the level of the output logic signal as a tone is detected.

The above-described circuit corresponds to the FM-300 series tone detector produced by Kinetic Technology, Inc.

The circuit described can be connected to plus-minus 12 volt power supplies with the output logic level pulled up to +5 volts. With R20 equal to 1K and no hysteresis resistor, the circuit will detect a signal which is between minus 3 and 0 DBM at its center frequency with a delay of between 20 and 40 milliseconds before producing a low level signal on the logic output lead **13*d*.** The logic common in this mode of operation is connected to ground.

In an alternative embodiment, the transistors Q1 and Q2 shown in detector 12 can comprise part of a four transistor array such as the array number 3108 made by RCA.

What is claimed is:

1. A tone detector circuit comprising:

means for filtering an input signal to produce a first output signal at a first selected frequency, said means for filtering comprising amplifier means including an inverting and a non-inverting input lead and an output lead, first feedback means connecting said output lead to said inverting input lead, second feedback means connecting said output lead to said non-inverting input lead, means connecting said non-inverting input lead to a first reference potential, means for transmitting said input signal to said inverting input lead, and means electrically connecting said means for transmitting to said output lead;

means for detecting said first output signal to produce a second output signal; and means for comparing said second output signal to a reference signal to produce a bilevel output signal, said bilevel output signal having a first level when said first output signal has an amplitude greater than a selected value and said bilevel output signal having a second level when said first output signal has an amplitude less than said selected value.

2. A circuit as in claim 1 wherein said first feedback means comprises a resistor;

said second feedback means comprises a resistor;

said means connecting said non-inverting input lead to said first reference potential comprises a resistor;

said means for transmitting comprises a resistive T network connected in series with a first capacitor; and said means electrically connecting said means for transmitting to said output lead comprises a second capacitor connecting the node between said resistive T network and said first capacitor to said output lead.

3. A circuit as in claim 2 wherein said resistive T network comprises first and second resistors connected in series and a third resistor connected between the node of said first and second resistors and said first reference potential.

4. A circuit as in claim 3 wherein said first reference potential comprises the common potential of the circuit.

5. A tone detector circuit comprising:

means for filtering an input signal to produce a first output signal at a first selected frequency;

means for detecting said first output signal to produce a second output signal, said means for detecting comprising first and second transistors each possessing an emitter, a collector, and a base, means electrically connecting the emitters of said first and second transistors to a first reference potential, means electrically connecting the bases of said first and second transistors to an input lead to said means for detecting, said input lead receiving said first output signal, means electrically connecting the collector of said first transistor to a second reference potential, means electrically connecting the collector of said second transistor to said second reference potential; and means electrically connecting the base of said second transistor to a third reference potential so as to attenuate the AC component of said first output signal; and means for comparing said second output signal to a reference signal to produce a bilevel output signal, said bilevel output signal having a first level when said first output signal has an amplitude greater than a selected value and said bilevel output signal having a second level when said first output signal has an amplitude less than said selected value.

6. A circuit as in claim 5 wherein said means electrically connecting the emitters of said transistors to a first reference potential comprises first and second resistors connecting said emitters and a third resistor connecting the node between said first and second resistors to said first reference potential.

7. A circuit as in claim 5 wherein said means electrically connecting the bases of said first and second transistors to an input lead to said means for detecting comprises fourth and fifth resistors, approximately equal in value, connecting the bases of said first and second transistors, respectively, to said input lead to said means for detecting.

8. A circuit as in claim 5 wherein said means electrically connecting the collector of said first transistor to said second reference potential comprises a sixth resitor;

said means electrically connecting the collector of said second transistor to said second reference potential comprises a seventh transistor connected in series with said sixth transistor; and said means electrically connecting the base of said second transistor to said third reference potential comprises a capacitor.

9. A circuit as in claim 8 wherein said third reference potential comprises the common potential of the circuit.

10. A tone detector circuit comprising:

means for filtering an input signal to produce a first output signal at a first selected frequency;

means for detecting said first output signal to produce a second output signal; and means for comparing said second output signal to a reference signal to produce a bilevel output signal, said bilevel output signal having a first level when said first output signal has an amplitude greater than a selected value and said bilevel output signal having a second level when said first output signal has an amplitude less than said selected value, said means for comparing comprising:

means for integrating said second output signal to produce a first integrated signal;

comparison means for comparing said first integrated signal to a threshold level and producing a high or low level signal in response thereto;

means for producing a high or low level output signal in response to a low or high level signal, respectively, from said comparison means; and means for changing, in response to a low level output signal from said means for producing, the threshold level to which said first integrated signal is compared thereby to lower the level of said second output signal required to maintain a low level signal from said means for comparing.

11. A tone detector circuit comprising:

means for filtering an input signal to produce a first output signal at a first selected frequency;

means for detecting said first output signal to produce a second output signal; and means for comparing said second output signal to a threshold level to produce a bilevel output signal, said bilevel output signal having a first level when said first output signal has an amplitude greater than a selected value and said bilevel output signal having a second level when said first output signal has an amplitude less than said selected value, said means for comparing comprising means for integrating said second output signal to produce a first integrated signal;

comparison means for comparing said first integrated signal to the threshold level and for producing a high or low level signal in response thereto;

means for producing a high or low level output signal in response to a low or high level signal, respectively, from said comparison means; and means for changing, in response to a low level signal from said means for producing, the threshold level to which said first integrated signal is compared thereby to lower the level of said second output signal required to maintain a low level output signal from said means for comparing, said comparison means comprising amplifier means including an inverting and a non-inverting input lead and an output lead;

voltage divider means connected between a second reference potential and a third reference potential, said inverting input lead being connected to a selected point on said voltage divider means thereby to generate said threshold level; and means for connecting said non-inverting input lead to said means for integrating thereby enabling said non-inverting input lead to receive said first integrated signal.

12. A circuit as in claim 11 wherein said means for producing comprises:

a transistor containing a base, a collector, and an emitter; and means for transmitting said low or high level signal from said comparison means to said base thereby to produce on said collector said high or low level output signal produced by said means for producing.

13. A circuit as in claim 12 wherein said means for changing comprises:

resistive means connecting said collector to said selected point, thereby to lower the potential at said selected point and thus said threshold level when said transistor draws collector current.

* * * * *